Figure 1:
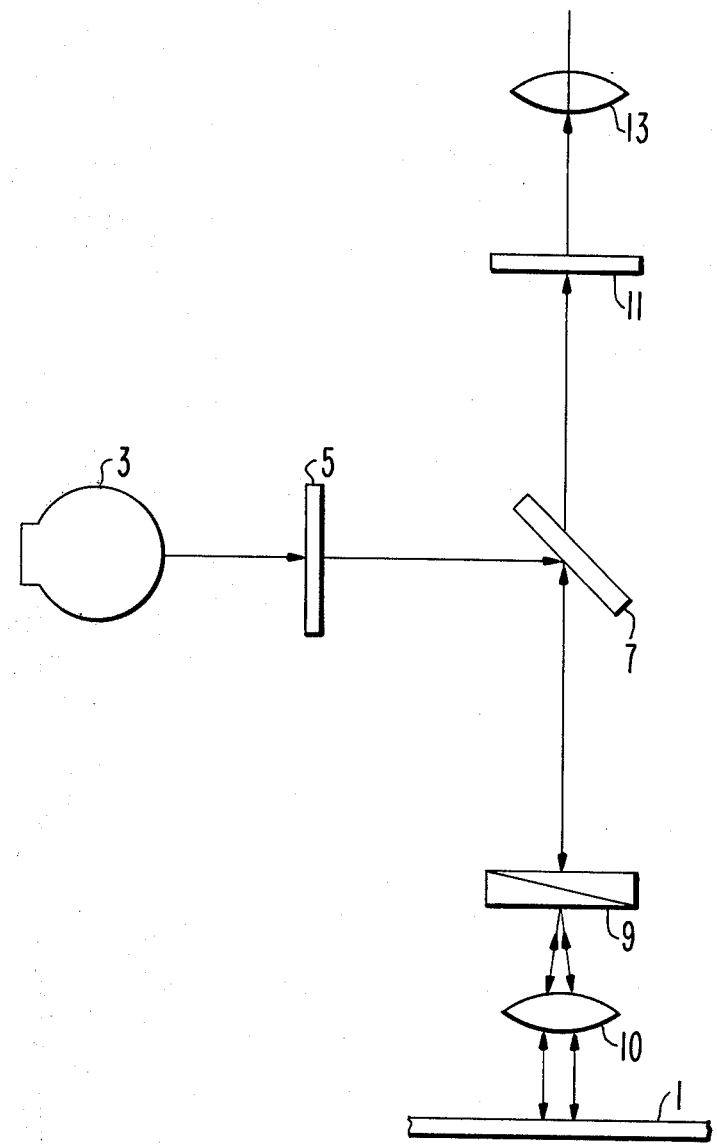

United States Patent [19]

Valembois et al.

[11] 4,320,567
[45] Mar. 23, 1982

[54] OPTICAL INSPECTION METHOD FOR DETERMINING MACHINABILITY

[75] Inventors: Pierre V. Valembois, Cranbury; Cheryl A. Deckert, Princeton; Edward J. Holub, Hamilton Square, all of N.J.

[73] Assignee: RCA Corporation, New York, N.Y.

[21] Appl. No.: 164,687

[22] Filed: Jun. 30, 1980

[51] Int. Cl.³ .................. B23Q 17/00; G01N 21/88
[52] U.S. Cl. .................................................. 29/407
[58] Field of Search ............. 29/DIG. 28, 407, 527.2; 72/47; 250/562, 572; 350/12, 13; 356/237, 351, 353, 359, 430

[56] References Cited

U.S. PATENT DOCUMENTS

| | | | |
|---|---|---|---|
| 3,796,495 | 3/1974 | Laub | 356/359 X |
| 3,842,194 | 10/1974 | Clemens | 178/6.6 A |
| 4,030,830 | 6/1977 | Holly | 356/359 |
| 4,030,835 | 6/1977 | Firester | 356/237 X |
| 4,044,379 | 8/1977 | Halter | 358/128 |
| 4,065,786 | 12/1977 | Stewart | 358/128 |
| 4,197,011 | 4/1980 | Hudson | 356/237 X |

Primary Examiner—Ervin M. Combs
Attorney, Agent, or Firm—E. M. Whitacre; J. S. Tripoli; J. E. Roehling

[57] ABSTRACT

In a method for determining the machinability of a metal substrate for use in an electromechanical recording apparatus a surface of a foundation is coated with a layer of metal. The metal layer is machined such that the metalized surface of the foundation is substantially flat and smooth. After the machining step, the metal surface is inspected for depressions with a microscope using a differential interference contrast technique. The number of depressions observed is indicative of the machinability of the coated foundation.

3 Claims, 7 Drawing Figures

OPTICAL INSPECTION METHOD FOR DETERMINING MACHINABILITY

The present invention relates generally to methods for determining the machinability of a cutting medium and, more particularly, to methods for determining the machinability of a substrate which is to be used in a mastering process to produce high density information records, such as video disc records of the type described in U.S. Pat. No. 3,842,194 issued to J. K. Clemens.

In certain high density information record/playback systems, video information is recorded as relatively short (e.g., 0.6–1.6 micrometers) reflectivity, transmission or relief variations along the length of an information track. Illustratively, the method of recording may be of a type shown in U.S. Pat. No. 4,044,379, issued to J. B. Halter. Pursuant to the Halter method, an electromechanically driven stylus (e.g., of diamond), responsive to a combined video and audio signal, records relatively short geometric variations, representative of the time variations of the signal, on a surface of a metal substrate. After the electromechanical recording operation, the recorded surface of the metal substrate has a relief pattern corresponding to that which is desired in the final record. Masters are made from the substrate, molds for making stampers, which are used to produce production line records, are made from the masters and a vinyl record is formed, having the desired relief pattern, from a stamper made from such a mold.

In order to record the fine groove and signal structure typically employed in a video disc (e.g., 10,000 groove convolutions per inch) the machinability of the recording surface of the substrate must be such that the recording stylus cuts the groove and signal information without tearing, smearing, chattering, ripping or chipping the surface during the recording process. The geometric variations along the length of the groove should be a substantially accurate representation of the modulated signals recorded thereon.

Bearing in mind the extremely dense groove structure of a video disc, it will be appreciated that the generation of substrates of acceptable machinability is critical in the record mastering process. Any significant incidence of machining imperfections in the finished surface results in a substrate which is not acceptable in manufacturing of such high groove density records. Therefore, it is extremely valuable to have some indication of the machinability of the substrate before attempting to cut a groove and signal element structure into a substrate surface.

A variety of approaches for selecting substrates which are of acceptable machinability exist in the prior art. For example, a laser defect detector may be used to inspect the groove and signal element structure after the recording process. Reference may be made to U.S. Pat. No. 4,030,835, issued to A. H. Firester, et al., entitled "Defect Detection System", for an illustration of a groove defect detection apparatus. In another approach, a test band is recorded on a surface of the substrate which is outside of the normally recorded area. Subsequent to the recording, this test band may be played on an optical video disc playback system, illustratively of a type described in U.S. Pat. No. 4,065,786 issued to W. C. Stewart, entitled "Video Disc Playback System".

From a cost and time standpoint, it is desirable to identify poor machining substrates early in the mastering process. In both of the approaches described above, especially the laser defect detection approach, a substantial amount of work is performed on the substrate prior to a determination of its machinability. Further, these methods do not detect all forms of defects. Large area (i.e., greater than 10 micrometers), shallow defects are not always picked up by the laser defect detector and, in the other approach, the area where the test band is recorded may not be representative of the entire substrate surface.

In accordance with the principles of the present invention, a method for determining the machinability of a video disc substrate is provided that is not subject to the aforementioned limitations.

In accordance with one aspect of the present invention, a method for selecting a recording medium for use in an electromechanical recording apparatus wherein a stylus is used to cut a groove modulated by a video signal on a surface of the medium is provided. In this method a surface of a foundation is coated with a layer of metal. Illustratively, the foundation which may be aluminum is coated with a layer of copper of approximately 0.30 mm thick. The metal layer is machined such that the coated surface of the foundation is planar. Then the machined surface is inspected for depressions with a microscope using a differential interference contrast technique whereby the number of depressions observed is indicative of the machinability of the coated foundation.

Figure 2:
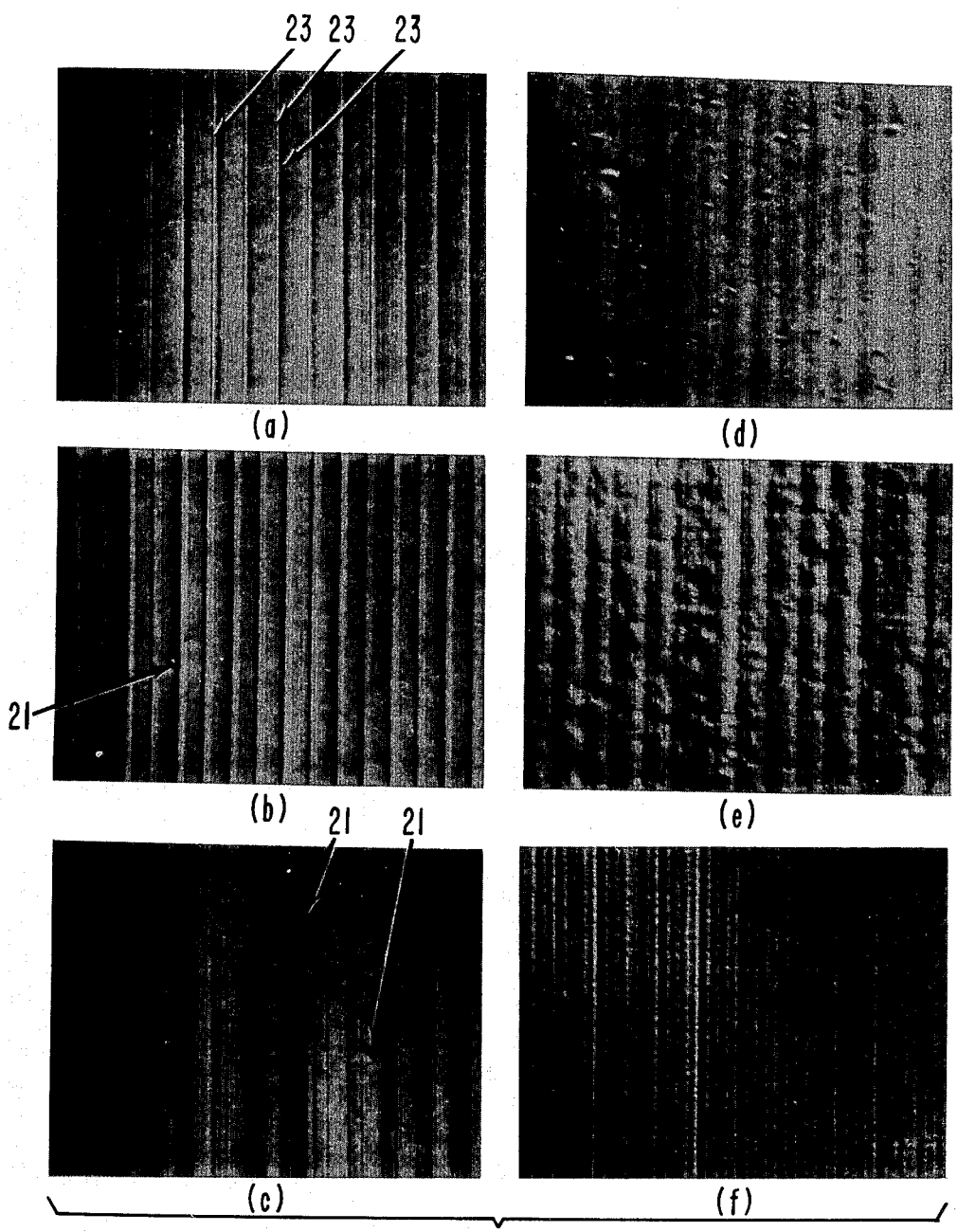

Other features and advantages of the invention will be more fully understood from the following detailed description of the preferred embodiment, the appended claims, and the accompanying drawing in which:

FIG. 1 is a diagrammatic representation of a differential interference contrast microscope for use in inspecting substrates in accordance with the principles of the present invention; and FIG. 2 shows photographs of various defect levels observed on substrates inspected with the apparatus of FIG. 1.

In the video disc mastering operations, a substrate on which high density information in the form of relatively short wavelength variations is recorded, may be comprised of a thin cutting medium of a metal or other material having a very homogeneous, and virtually defect-free, extremely fine grain structure (e.g., copper) on a substrate disc (e.g., aluminum). Alternatively the substrate could be a solid disc of a cutting medium having a homogeneous and fine grain structure. In the preferred embodiment, a thin deposit of copper (e.g., approximately 0.30 mm) is electroformed on an aluminum substrate disc. The copper deposit is then faced off to make the surface to be recorded flat. Materials having properties which can be processed to have a very fine crystalline structure (e.g., copper, nickel, tin, aluminum and some of their alloys) are suitable for the presently described recording technique.

After the facing operation, a groove having a quiescent groove depth less than one micrometer is cut and a short wavelength modulation of the groove depth is simultaneously cut on the flat substrate surface. Reference may be had to U.S. Pat. No. 4,044,379 issued to J. B. Halter for a description of the groove and signal cutting operation. The electromechanical recording of short wavelength modulation in a metallic medium provides a high signal-to-noise ratio as compared with other prior art recording techniques, however, the machinability of the metallic medium may vary due to gradual changes in the deposition parameters and these variations may affect the quality of the final product.

The recorded surface of the cutting medium should be a faithful reproduction of the geometry and motion of the cutting tool. The introduction of any surface features unrelated to the tool geometry and motion is deleterious. It has been found that metal substrates having poor machinability can be identified quite reliably by the method of the present invention. After the copper surface has been prepared by facing it with a diamond tool bit having a large radius (e.g., greater than 3 mm) and before the groove/signal cutting operation the metal surface is inspected with an optical microscope at a magnification of about 200 to 250 times using a differential interference contrast technique. Shallow defects typically 5–15 $\mu$m across, which usually appear as annular depressions, can be observed after the diamond turning operation which is performed illustratively with a 6 mm radius tool. These defects are generally symptomatic of a poorly machining substrate; subsequent difficulties in groove and signal recording can generally be traced back to the appearance of defects during inspection.

FIG. 1 illustrates an optical microscope system (e.g., using a Normarski differential interference contrast system) for use in inspecting a substrate 1. The light from source 3 which passes through polarizer 5 is directed by half silvered mirror 7 to impinge on substrate 1 via Wollaston prism 9 and objective lens 10. After reflection from the surface of substrate 1, the light returns via objective 10 and Wollaston prism 9 to impinge on the half-silvered mirror 7. The light beam of interest passes through the half-silvered mirror 7 to eyepiece 13 via analyzer 11.

In operation, the unpolarized light emerging from source 3 is plane polarized by the polarizer 5. When the polarized light passes through Wollaston prism 9 for the first time, the birefringent nature of Wollaston prism 9 splits the incident light wave into two components which are plane polarized and whose vibration planes run perpendicular to each other. The two beam components travel along parallel paths slightly separated laterally in relation to each other after they emerge from objective 10. They are reflected from the substrate 1 surface and converge at the Wollaston prism 9 where they are recombined into a single beam. At this point the two components form a single beam but they are still plane polarized and their vibration planes are at right angles to each other. In order to enable the two components to produce the desired interference effect in the intermediate image plane, the vibration planes must coincide. This is achieved by analyzer 11 which is inserted into the light path between prism 9 and eyepiece 13. The resulting intermediate interference image may be viewed through eyepiece 13. By properly selecting and positioning the optical components, the lateral separation of the two beams emerging from objective 10 is selected to be of the same order as the resolving power of the optical system. In this case the distance between neighboring interference fringes exceeds the width of the field of view of eyepiece 13 and Nomarski differential interference contrast is obtained. Optical path length and reflection phase retardation differences on the surface being inspected are transformed into differences in brightness. These differences enhance the clarity of the microscopic image which appears to be almost three-dimensional, due to a certain shadow effect.

Illustrations of various defect levels on diamond turned metal substrate surfaces are shown by photographs a through f in FIG. 2. The magnification of the surfaces in FIG. 2 is illustratively approximately 200. Lines 23 illustrate tool marks which repeat from spiral to spiral on the surface of a substrate. Defects 21 vary from 0 defects per field as shown in photograph a of FIG. 2 or one defect per field as shown in photograph b to many thousands of overlapping defects per field as shown in photograph f of FIG. 2.

Defect levels may vary from the center of a substrate to the edge. Therefore, to make a precise defect count several points on the substrate surface should be inspected.

The likelihood of a poorly machining substrate at a particular defect level is represented in Table 1 below.

TABLE 1

| No. of Defects Per Field of View at Approx. 200X | Machinability |
| --- | --- |
| 1 | Substrate will machine poorly. |
| 0.1 | Better than 50% chance that substrate will machine poorly. |
| 0.01 | Substrate may machine poorly. |

What is claimed is:

1. A method for selecting a medium for use in an electromechanical recording apparatus wherein a stylus is used to cut a groove modulated by a video signal on said medium, comprising the steps of:
   coating a surface of a foundation with a layer of metal;
   machining said layer of metal such that said coated surface of said foundation is substantially planar;
   inspecting said machined surface for depressions with a microscope using a differential interference contrast technique; recording the number of depressions observed during said inspection step to establish an indication of the machinability of said coated foundation; and
   selecting said coated foundation for further processing and subsequent use in said electromechanical recording apparatus based upon the number of depressions observed and recorded during said inspection step.

2. The method in accordance with claim 1 wherein said foundation is a disc shaped aluminum substrate and wherein said foundation is coated with a layer of copper approximately 0.30 millimeters thick during said coating step.

3. The method in accordance with claim 2 wherein said machining step comprises the steps of:
   mounting said foundation on a metal shaping machine;
   mounting a cutting tool having an approximately six millimeter radius cutting tip on said metal shaping machine in a cutting position with respect to said mounted foundation; and
   establishing relative motion between said mounted foundation and said mounted cutting tool such that said layer of copper is shaped to a substantially flat and smooth surface.

* * * * *